US009764859B2

(12) United States Patent
Ho et al.

(10) Patent No.: US 9,764,859 B2
(45) Date of Patent: Sep. 19, 2017

(54) EFFICIENT STATIONKEEPING DESIGN FOR MIXED FUEL SYSTEMS

(71) Applicant: The Boeing Company, Chicago, IL (US)

(72) Inventors: Yiu-Hung Monte Ho, Palos Verdes Estates, CA (US); Jeffrey Scott Noel, Torrance, CA (US)

(73) Assignee: The Boeing Company, Chicago, IL (US)

( * ) Notice: Subject to any disclaimer, the term of this patent is extended or adjusted under 35 U.S.C. 154(b) by 123 days.

(21) Appl. No.: 14/753,583

(22) Filed: Jun. 29, 2015

(65) Prior Publication Data

US 2016/0376033 A1 Dec. 29, 2016

(51) Int. Cl.
*B64G 1/26* (2006.01)
*B64G 1/24* (2006.01)
*B64G 1/40* (2006.01)

(52) U.S. Cl.
CPC ............. *B64G 1/26* (2013.01); *B64G 1/242* (2013.01); *B64G 1/409* (2013.01)

(58) Field of Classification Search
CPC ............. B64G 1/24; B64G 1/242; B64G 1/26
See application file for complete search history.

(56) References Cited

U.S. PATENT DOCUMENTS

| 5,446,465 | A | | 8/1995 | Diefes et al. | |
|---|---|---|---|---|---|
| 5,595,360 | A | * | 1/1997 | Spitzer | B64G 1/007 244/158.5 |
| 5,813,633 | A | * | 9/1998 | Anzel | B64G 1/26 244/169 |
| 5,851,309 | A | | 12/1998 | Kousa | |
| 5,984,236 | A | | 11/1999 | Keitel et al. | |
| 6,015,116 | A | | 1/2000 | Anzel et al. | |
| 6,135,394 | A | * | 10/2000 | Kamel | B64G 1/242 244/158.8 |
| 7,918,420 | B2 | | 4/2011 | Ho | |
| 2014/0361123 | A1 | | 12/2014 | Celerier | |
| 2016/0376033 | A1 | | 12/2016 | Ho et al. | |

FOREIGN PATENT DOCUMENTS

EP 2810875 A2 12/2014
FR 2786893 A1 6/2000

* cited by examiner

*Primary Examiner* — Nicholas McFall
(74) *Attorney, Agent, or Firm* — Duft Bornsen & Fettig LLP

(57) ABSTRACT

Apparatus and methods for stationkeeping in a satellite. The satellite includes a north electric thruster and a south electric installed on a zenith side. An orbit controller selects a duration of a burn of the north electric thruster proximate to an ascending node that differs from a duration of a burn of the south electric thruster proximate to a descending node. The orbit controller is configured to select an offset of the burn of the north electric thruster in relation to the ascending node that differs from an offset of the burn of the south electric thruster in relation to the descending node.

20 Claims, 13 Drawing Sheets

EFFICIENT STATIONKEEPING DESIGN FOR MIXED FUEL SYSTEMS

FIELD

This disclosure relates to the field of satellites, and more particularly, to stationkeeping for satellites.

BACKGROUND

A geosynchronous satellite is a satellite that orbits the Earth and follows the direction of the Earth's rotation. One revolution of a geosynchronous satellite around the Earth takes about 24 hours, which is the same amount of time it takes for the Earth to rotate once about its axis. These types of satellites are considered geosynchronous because they appear stationary when viewed from a particular location on the Earth, and are commonly used as communication satellites.

The geosynchronous satellites have assigned orbits above the Earth's equator so they do not collide with one another or interfere with each other's communications. Geosynchronous satellites orbit at a radius of about 42,164 kilometers from the center of the Earth. Satellites at this radius make one revolution around the Earth in about 24 hours (a sidereal day) due to the gravitational force of the Earth. The orbit for a satellite may be affected by perturbations, such as gravitational forces from the Sun and Moon, the non-circular shape of the Earth, solar radiation pressure, etc. To negate the perturbations and keep a satellite in its assigned orbit, propulsion systems on the satellite perform active maneuvers that are referred to as "stationkeeping" maneuvers. When observed from a location on the Earth, the position of a satellite is maintained within an assigned orbital station or "box" which has predetermined dimensions. Stationkeeping involves control of the satellite's longitude, the eccentricity of its orbit, and the inclination of its orbital plane from the Earth's equatorial plane.

An example of stationkeeping is described in U.S. Pat. No. 6,015,116, which issued on Jan. 18, 2000. The propulsion system described in '116 uses four thrusters that are diagonally arranged on the back (zenith) side of the satellite. One pair of the thrusters have thrust lines directed through the center of mass of the satellite, while the other pair have thruster forces that are spaced by momentum arms from the center of mass. Another example of stationkeeping is described in U.S. Pat. No. 7,918,420, which issued on Apr. 5, 2011. Both of the patents are incorporated by reference as if fully included herein.

It is desirable to identify new and improved stationkeeping maneuvers that are effective yet fuel efficient.

SUMMARY

Embodiments described herein provide stationkeeping maneuvers for a satellite. A satellite as discussed herein includes a satellite bus having a nadir side that faces the Earth and a zenith side opposite the nadir side. A north electric thruster is installed toward a north region of the zenith side and oriented downward to produce thrust through a center of mass of the satellite. A south electric thruster is installed toward a south region of the zenith side and oriented upward to produce thrust through the center of mass of the satellite. An orbit controller controls stationkeeping maneuvers for the satellite. The orbit controller is configured to select a duration of a burn of the north electric thruster proximate to an ascending node that differs from a duration of a burn of the south electric thruster proximate to a descending node. The difference between the burn durations creates an eccentricity change substantially along an x-axis of a geocentric coordinate system. The orbit controller is configured to select an offset of the burn of the north electric thruster in relation to the ascending node that differs from an offset of the burn of the south electric thruster in relation to the descending node. The difference between the burn offsets creates an eccentricity change substantially along the y-axis of the geocentric coordinate system. Due to the differences in the burns at the ascending and descending nodes, a target eccentricity change ($\Delta e$) can be produced by these maneuvers. The target $\Delta e$ can therefore be used to compensate for eccentricity caused by solar radiation pressure and other perturbations.

In one embodiment, the satellite further includes an east chemical thruster installed on an east side of the satellite bus to produce thrust through the center of mass of the satellite, and a west chemical thruster installed on a west side of the satellite bus to produce thrust through the center of mass of the satellite.

In another embodiment, the orbit controller is configured to control a burn of one of the west chemical thruster or a burn of the east chemical thruster proximate to the ascending node, and to control a burn of the other one of the west chemical thruster or a burn of the east chemical thruster proximate to the descending node. The burn(s) of the chemical thrusters creates an additional $\Delta e$ component.

In another embodiment, the difference in the burn durations for the electric thrusters and the difference in the offsets of the burns of the electric thrusters produce a net radial velocity change of the satellite, where the net radial velocity change produces a delta-eccentricity component for the orbit of the satellite due to the burns of the electric thrusters. The orbit controller is configured to control a burn of one of the east chemical thruster or the west chemical thruster at a first location along the orbit of the satellite which produces a first tangential velocity change of the satellite, where the first tangential velocity change produces a delta-eccentricity component due to the burn of the one chemical thruster. The orbit controller is configured to select the first location of the burn of the one chemical thruster so that the delta-eccentricity component due to the burn of the one chemical thruster adds to the delta-eccentricity component due to the burns of the electric thrusters. In another embodiment, the orbit controller is configured to control a burn of the other one of the east chemical thruster or the west chemical thruster at a second location along the orbit of the satellite which produces a second tangential velocity change of the satellite, where the second tangential velocity change produces a delta-eccentricity component due to the burn of the other chemical thruster. The orbit controller is configured to select the second location of the burn of the other chemical thruster so that the delta-eccentricity component due to the burn of the other chemical thruster adds to the delta-eccentricity component due to the burns of the electric thrusters and the delta-eccentricity component due to the burn of the one chemical thruster.

In another embodiment, the orbit controller is configured to determine an inclination of an orbital plane of the satellite, and to determine a total burn time for the burn of the north electric thruster and the burn of the south electric thruster based on the inclination.

In another embodiment, the orbit controller is configured to determine a position of the Sun in the geocentric coordinate system based on time of year, and to select the duration and offset of the burn of the north electric thruster and the duration and offset of the burn of the south electric thruster to produce a target eccentricity change that points behind the position of the Sun by 90°±5°.

In another embodiment, the north electric thruster is oriented at a first angle to a north-south axis of the satellite, where the first angle is 35°±25°. The south electric thruster is oriented at a second angle to the north-south axis of the satellite, where the second angle is 35°±25°.

In another embodiment, the north electric thruster and the south electric thruster use xenon as a propellant.

Another embodiment comprises a method for controlling stationkeeping maneuvers for a satellite as described above. The method includes selecting a duration of a burn of the north electric thruster proximate to an ascending node that differs from a duration of a burn of the south electric thruster proximate to a descending node. The method further includes selecting an offset of the burn of the north electric thruster in relation to the ascending node that differs from an offset of the burn of the south electric thruster in relation to the descending node.

Another embodiment comprises an orbit controller configured to control stationkeeping maneuvers of a satellite as described above. The orbit controller is configured to select a duration of a burn of the north electric thruster proximate to an ascending node that differs from a duration of a burn of the south electric thruster proximate to a descending node. The orbit controller is configured to select an offset of the burn of the north electric thruster in relation to the ascending node that differs from an offset of the burn of the south electric thruster in relation to the descending node.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
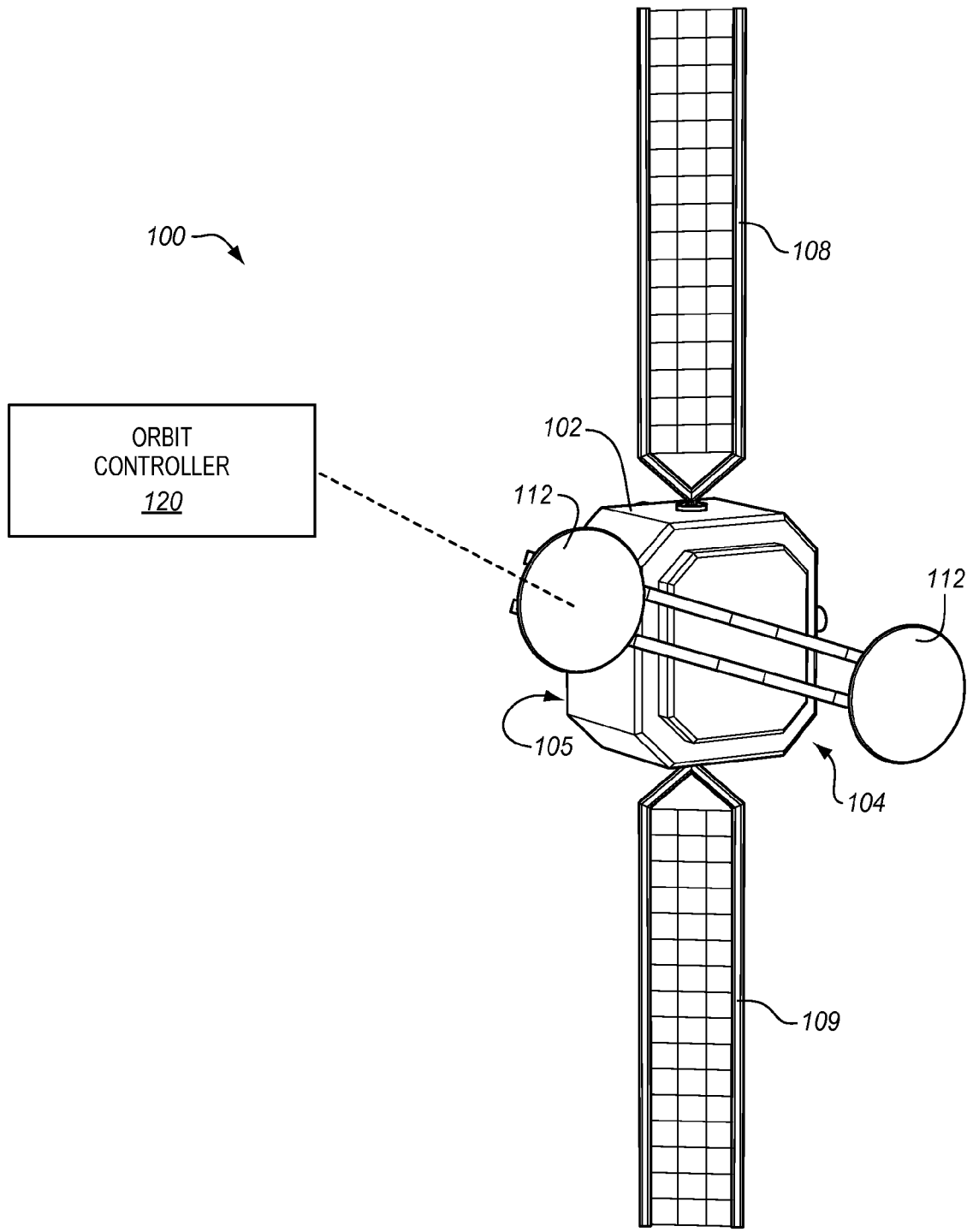
FIG. 1 illustrates a satellite in an exemplary embodiment.

FIG. 1 illustrates a satellite 100 in an exemplary embodiment. Satellite 100 includes a main body that carries the payload of the satellite, which is referred to as a satellite bus 102. When viewed from the Earth, satellite bus 102 includes a nadir side 104 (or front side) and an opposing zenith side 105 (or back side). The terms "side" or "face" may be used interchangeably when discussing satellite bus 102. Satellite 100 also includes solar wings 108-109 that are attached to satellite bus 102, and may be used to derive electricity from the Sun to power different components on satellite 100. Satellite 100 also includes one or more antennas 112 that may be used for communications. The structure of satellite 100 shown in FIG. 1 is an example, and may vary as desired.

Satellite 100 is configured to orbit around the Earth, such as in a geosynchronous orbit. To keep satellite 100 in its assigned orbit, an orbit controller 120 is coupled to satellite 100. Orbit controller 120 comprises devices, components, or modules (including hardware, software, or a combination of hardware and software) that control stationkeeping maneuvers for satellite 100. Orbit controller 120 may be located on Earth, and able to communicate with satellite 100 over wireless signals. Orbit controller 120 may alternatively be located on satellite 100. Orbit controller 120 may also be modularized with a portion of orbit controller 120 located on Earth, and a portion located locally on satellite 100.

Figure 2:
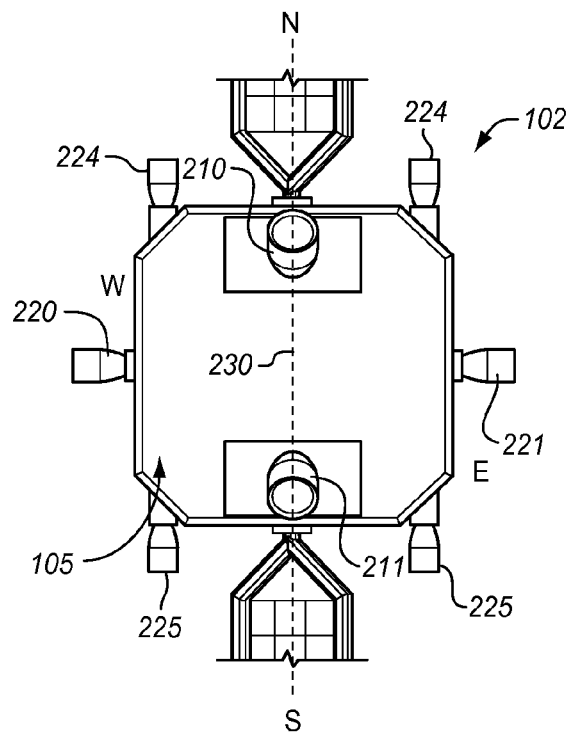
FIG. 2 illustrates the zenith side of a satellite bus in an exemplary embodiment.

Satellite 100 includes a propulsion system that is used for stationkeeping maneuvers. FIG. 2 illustrates the zenith side 105 of satellite bus 102 in an exemplary embodiment. The top side of satellite bus 102 is referred to as the north side (indicated by "N"), and the bottom side of satellite bus 102 is referred to as the south side (indicated by "S"). The left side of satellite bus 102 in FIG. 2 is referred to as the west side (indicated by "W"), and the right side of satellite bus 102 in FIG. 2 is referred to as the east side (indicated by "E"). The zenith side 105 of satellite bus 102 includes a pair of electric thrusters 210-211 that are part of the propulsion system. An electric thruster is a type of thruster that produces electric thrust by accelerating ions. In a typical electric thruster, a propellant (e.g., xenon) is injected into an ionization chamber and ionized by electron bombardment. The ions are then accelerated by an electromagnetic field, and emitted from the thruster as exhaust that produces thrust. One example of an electric thruster is a Xenon Ion Propulsion System (XIPS©) manufactured by L-3 Communications of Aurora, Colo.

Electric thruster 210 is installed toward a north region of the zenith side 105, and is referred to herein as the north electric thruster. Electric thruster 211 is installed toward a south region of the zenith side 105, and is referred to herein as the south electric thruster. In this embodiment, north electric thruster 210 and south electric thruster 211 are centered on the zenith side 105 along the north-south axis 230 of satellite bus 102. In other embodiments, north electric thruster 210 and south electric thruster 211 may be off center.

Figure 3:
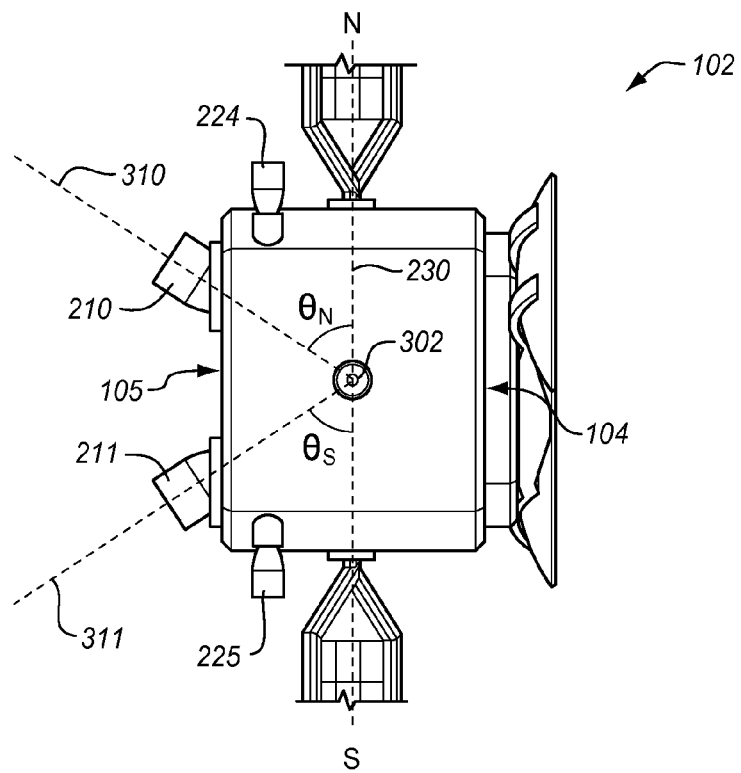
FIG. 3 is a side view of a satellite bus in an exemplary embodiment.

FIG. 3 is a side view of satellite bus 102 in an exemplary embodiment. North electric thruster 210 is oriented or tilted downward to produce thrust through the center of mass 302 of satellite 100. Line 310 represents the thrust line of north electric thruster 210 that passes through the center of mass 302. The orientation of north electric thruster 210 forms a cant angle $\theta_N$ between the thrust line 310 and the north-south axis 230 of satellite bus 102. The cant angle $\theta_N$ may be 35°±25°. North electric thruster 210 may be fixed at a desired angle, or may be gimbaled so that orbit controller 120 can adjust the cant angle $\theta_N$ of north electric thruster 210 as desired. Due to the orientation of north electric thruster 210, it is able to generate thrust in the south direction (downward in FIG. 3), and radially toward the Earth.

South electric thruster 211 is oriented or tilted upward to produce thrust through the center of mass 302 of satellite 100. Line 311 represents the thrust line of south electric thruster 211 that passes through the center of mass 302. The orientation of south electric thruster 211 forms a cant angle $\theta_S$ between the thrust line 311 and the north-south axis 230 of satellite bus 102. The cant angle $\theta_S$ may be 35°±25°. South electric thruster 211 may be fixed at a desired angle, or may be gimbaled so that orbit controller 120 can adjust the cant angle $\theta_S$ of south electric thruster 211 as desired. Due to the orientation of south electric thruster 211, it is able to generate thrust in the north direction (upward in FIG. 3), and radially toward the Earth.

The number or positions of electric thrusters 210-211 as shown in FIGS. 2-3 provide an exemplary configuration. The stationkeeping maneuvers discussed herein apply to any configuration where electric thrusters produce an out-of-plane velocity change (or normal velocity change) and a radial velocity change.

In FIG. 2, a chemical thruster 220 is installed on the west side of satellite bus 102, and a chemical thruster 221 is installed on the east side of satellite bus 102. A chemical thruster is a type of thruster that burns liquid propellant to produce thrust. One type of chemical thruster is referred to as a bipropellant (or biprop) thruster that burns a liquid fuel and a liquid oxidizer in a combustion chamber. Chemical thruster 220 may be centered on the west side of satellite bus 102 to produce thrust through the center of mass 302 of satellite 100 (see FIG. 3). Likewise, chemical thruster 221 may be centered on the east side of satellite bus 102 to produce thrust through the center of mass 302 of satellite 100.

In one embodiment, chemical thrusters 224 may be installed on the north side of satellite bus 102, and chemical thrusters 225 may be installed on the south side of satellite bus 102. The north and south chemical thrusters 224-225 are optional. If north and south chemical thrusters 224-225 are installed, their location may vary depending on antennas, solar panels, and other payload that is attached to the north and south sides of satellite bus 102.

The propulsion system of satellite 100 may include other thrusters not shown in FIGS. 2-3. For example, a redundant electric thruster may be installed on the north region of the zenith side 105 in case north electric thruster 210 fails. Similarly, a redundant electric thruster may be installed on the south region of the zenith side 105 in case south electric thruster 211 fails. Additional chemical thrusters may also be installed on the zenith side 105, and any combination of the north, south, east, and west sides. Because thrusters and the propellant are expensive, it may be desirable to reduce the number of thrusters used for stationkeeping maneuvers, and to reduce the number of maneuvers performed during stationkeeping.

Figure 4:
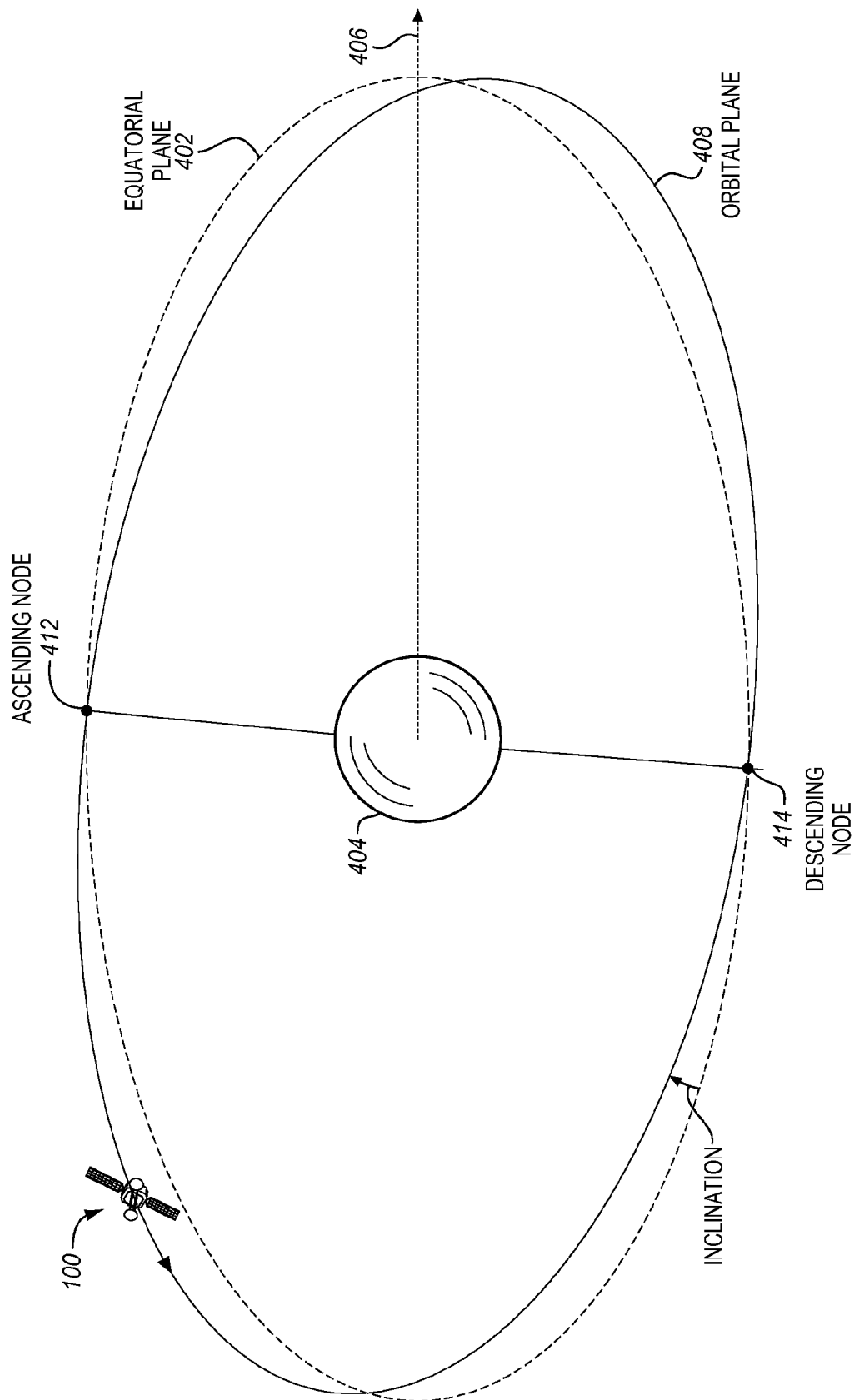
FIG. 4 illustrates an orbit of a satellite in an exemplary embodiment.

FIG. 4 illustrates a orbit of satellite 100 in an exemplary embodiment. The dotted ellipse represents the equatorial plane 402 of the Earth 404, which is the plane that passes through the equator of the Earth 404. The dotted arrow represents the First Point of Aries 406 where the equatorial plane passes the center of the Sun. The solid ellipse represents the orbital plane 408 of satellite 100 as it orbits the Earth 404.

If the Earth 404 was a perfect sphere and was isolated from other bodies in the solar system, then the orbit of a satellite would be an ellipse of a constant size and shape in a plane whose direction would remain fixed. However, different forces perturb the orbit of satellite 100, which causes the shape of the orbit to change and the orientation of the orbital plane 408 to differ from the equatorial plane 402. For example, gravitational forces of the Sun and Moon, the non-spherical shape of the Earth 404, solar radiation pressure, etc., can affect the orbit of satellite 100. Perturbations may cause the orbital plane 408 of satellite 100 to tilt in relation to the equatorial plane 402, which is referred to as inclination. Inclination is an orbital element that describes the angle between the orbital plane of a satellite and the equatorial plane. When the orbital plane 408 tilts in relation to the equatorial plane 402, the relationship between the orbital plane 408 and the equatorial plane 402 may be described by its orbital nodes. The ascending node is where the orbital plane 408 intersects the equatorial plane 402 going from south to north. In FIG. 4, the ascending node 412 is about 90° from the First Point of Aries 406. The descending node is where the orbital plane 408 intersects the equatorial plane 402 going from north to south. In FIG. 4, the descending node 414 is about 270° from the First Point of Aries 406, or 180° from the ascending node 412.

Perturbations may also cause the orbit of satellite 100 to be more elliptical than circular, which is referred to as eccentricity. Eccentricity is an orbital element that indicates the deviation of an orbit from a circle. An eccentricity value of 0 indicates a circular orbit, and values between 0 and 1 describe an elliptical orbit. The eccentricity of an orbit may be characterized by an eccentricity vector, which is a vector that points towards perigee and has a magnitude equal to the orbit's scalar eccentricity (the magnitude is between 0 and 1, and is unitless). When an orbit has eccentricity greater than 0, the shape of the orbit becomes elliptical around the Earth rather than circular. For an elliptical orbit, the longest and shortest lines that can be drawn through the center of an ellipse are called the major axis and minor axis, respectively. The semi-major axis is one-half of the major axis, and represents a mean distance from the satellite to the Earth. Perigee is the point in the orbit closest to the Earth, and opposite of perigee is apogee, which is the farthest point in the orbit from the Earth. When describing an elliptical orbit, the eccentricity vector points at perigee, and has a magnitude equal to the eccentricity (e) of the ellipse (0<e<1).

Figure 5:
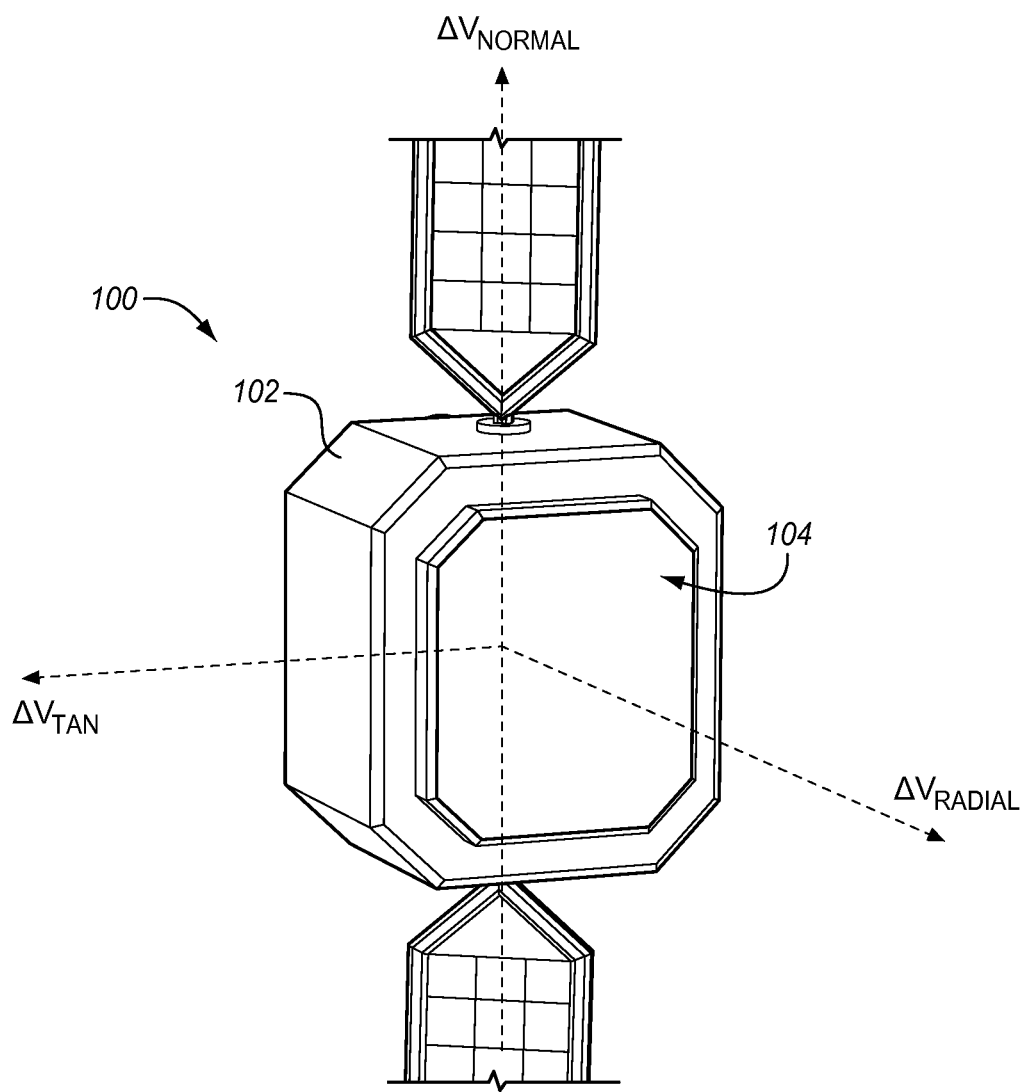
FIG. 5 illustrates velocity vectors resulting from thruster burns in an exemplary embodiment.

The embodiments below describe stationkeeping maneuvers that compensate for inclination and eccentricity of the satellite's orbit. Stationkeeping maneuvers involve burns of one or more thrusters of satellite 100 as it orbits the Earth 404. A burn of a thruster creates or produces a change in velocity (ΔV) of satellite 100. FIG. 5 illustrates velocity vectors resulting from thruster burns in an exemplary embodiment. Thruster burns can produce a ΔV in a normal direction, a tangential direction, and/or a radial direction. The normal direction is out of the orbital plane of satellite 100, the tangential direction is in the direction of travel of satellite 100 along its orbit, and the radial direction is toward the Earth 404. Although the electric thrusters 210-211 are not visible in FIG. 5, a burn of the north electric thruster 210 will produce a ΔV in the radial direction ($\Delta V_{radial}$) and the normal direction ($\Delta V_{normal}$) due to its cant angle (see FIG. 3). A burn of the south electric thruster 211 will produce a ΔV in the radial direction and the normal direction due to its cant angle (see FIG. 3). A burn of the west chemical thruster 220 or the east chemical thruster 221 will produce a ΔV in the tangential direction ($\Delta V_{tan}$).

A ΔV in the normal direction may be used to compensate for inclination of the orbital plane 408 (see FIG. 4). Maneuvers at or proximate to the orbital nodes provide for the most effective compensation for inclination. For example, a burn of the north electric thruster 210 proximate to ascending node 412 produces a ΔV in the normal direction, and a burn of the south electric thruster 211 proximate to descending node 414 also produces a ΔV in the normal direction. The total $\Delta V_{normal}$ compensates for inclination of the orbital plane 408. Each of these burns also produces a ΔV in the radial direction. When the duration of the burns are equal, the $\Delta V_{radial}$ produced at ascending node 412 and at descending node 414 cancel each other so that there is no net $\Delta V_{radial}$.

Electric thrusters 210-211 are effectively used to compensate for inclination in this manner, but are not traditionally used to compensate for eccentricity of the satellite's orbit. The embodiments described herein use the electric thrusters 210-211 to compensate for eccentricity in addition to inclination.

Figure 6:
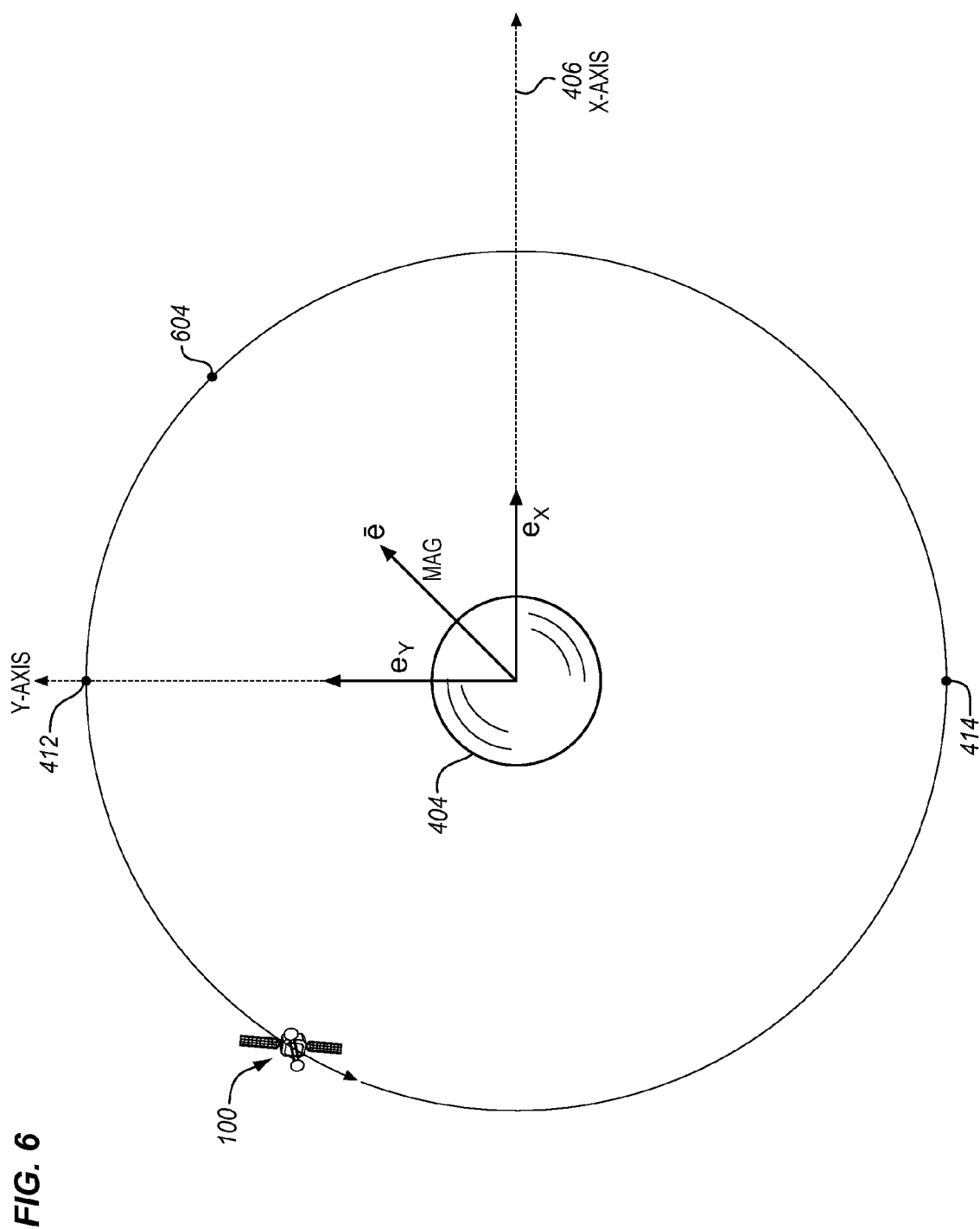
FIG. 6 illustrates eccentricity of a satellite's orbit.

FIG. 6 illustrates eccentricity of the orbit for satellite 100. The orbit of satellite 100 in FIG. 6 is shown in a geocentric coordinate system as an example. The x-axis (or K1-axis) corresponds with the First Point of Aries 406, and the y-axis (or H1-axis) is shown as 90° from the x-axis. The z-axis for a geocentric coordinate system would be north-south along the poles of the Earth 404, which is into and out of the page in FIG. 6. The eccentricity of an orbit may be represented by an eccentricity vector. The eccentricity vector (e) includes an x-component ($e_x$) along the x-axis and a y-component ($e_y$) along the y-axis. The eccentricity vector points at perigee 604, and has a magnitude MAG.

Figure 7:
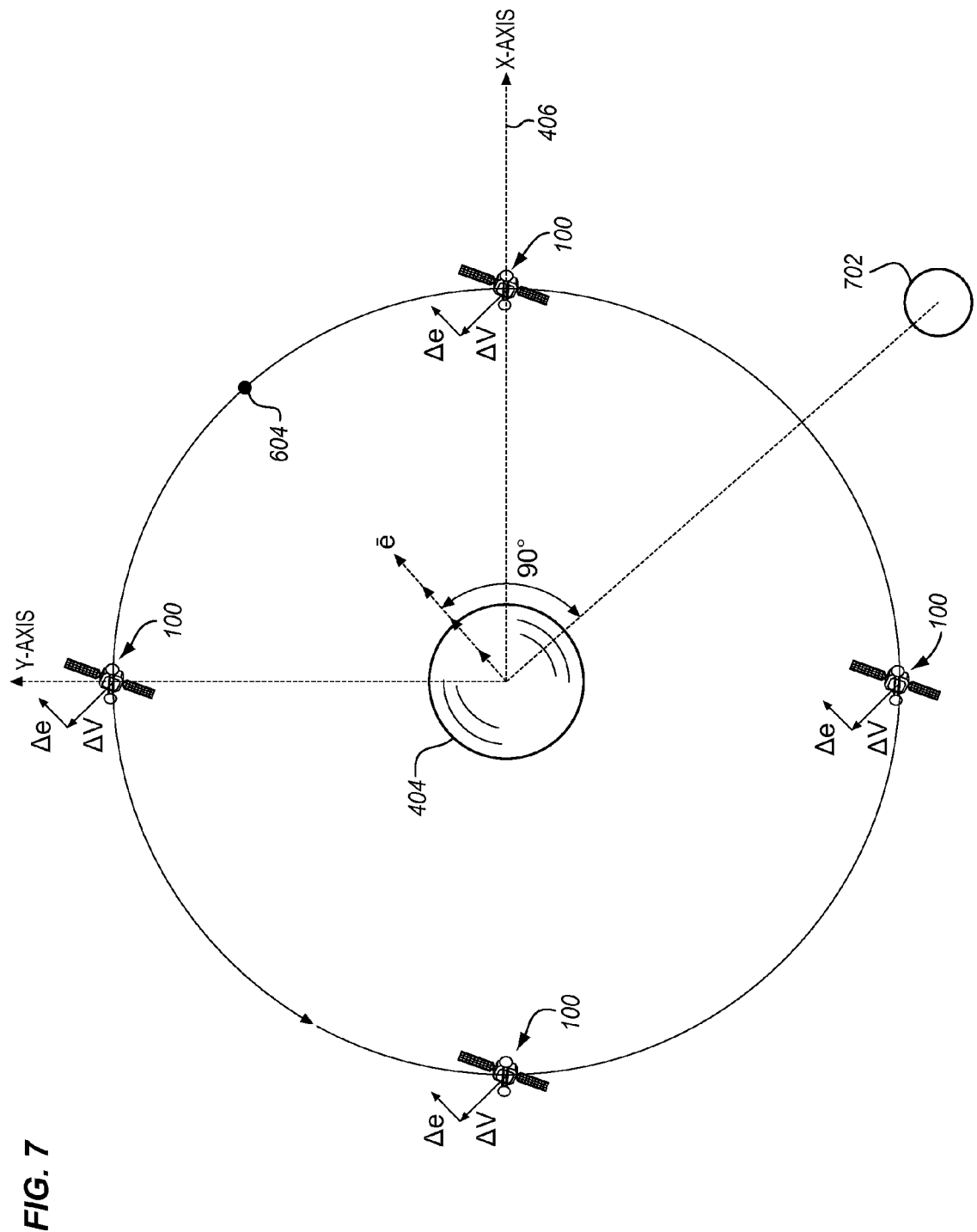
FIG. 7 illustrates eccentricity caused by solar radiation pressure.

The eccentricity shown in FIG. 6 may be caused by solar radiation pressure and/or other perturbations. FIG. 7 illustrates eccentricity caused by solar radiation pressure. In a geocentric model, the position of the Sun 702 depends on the time of year. For example, at the vernal equinox, the Sun 702 will be at the First Point of Aries 406, which is 0°. Over a year, the Sun 702 will "orbit" the Earth 404 about 1° per day (360°÷365 days≈1°/day). The Sun 702 is illustrated at about 300° in FIG. 7. The solar radiation pressure from the Sun 702 pushes on satellite 100 as it orbits. This pressure will create a ΔV in a direction away from the Sun 702. FIG. 7 illustrates a ΔV produced at four different orbital positions, but it is understood that the pressure can affect the satellite 100 along the entire orbit.

A change in velocity (ΔV) of satellite 100 produces a change in eccentricity (Δe) that is orthogonal to the ΔV. As shown in FIG. 7, each ΔV results in a corresponding Δe component that points 90° behind the ΔV. The Δe components add to produce the eccentricity vector for the orbit caused by solar radiation pressure. As can be seen in FIG. 7, the eccentricity caused by solar radiation pressure points 90° ahead of the Sun 702. Thus, perigee for the satellite's orbit will lead the Sun 702 by 90°. If the Sun 702 were at zero degrees (around March 21$^{st}$), then the eccentricity caused by solar radiation pressure would point to 90°. If the Sun 702 were at 90°, then the eccentricity caused by solar radiation pressure would point to 180°. If the Sun 702 were at 180° (around September 21$^{st}$), then the eccentricity caused by solar radiation pressure would point to 270°. If the Sun were at 270°, then the eccentricity caused by solar radiation pressure would point to 0°.

Figure 8:
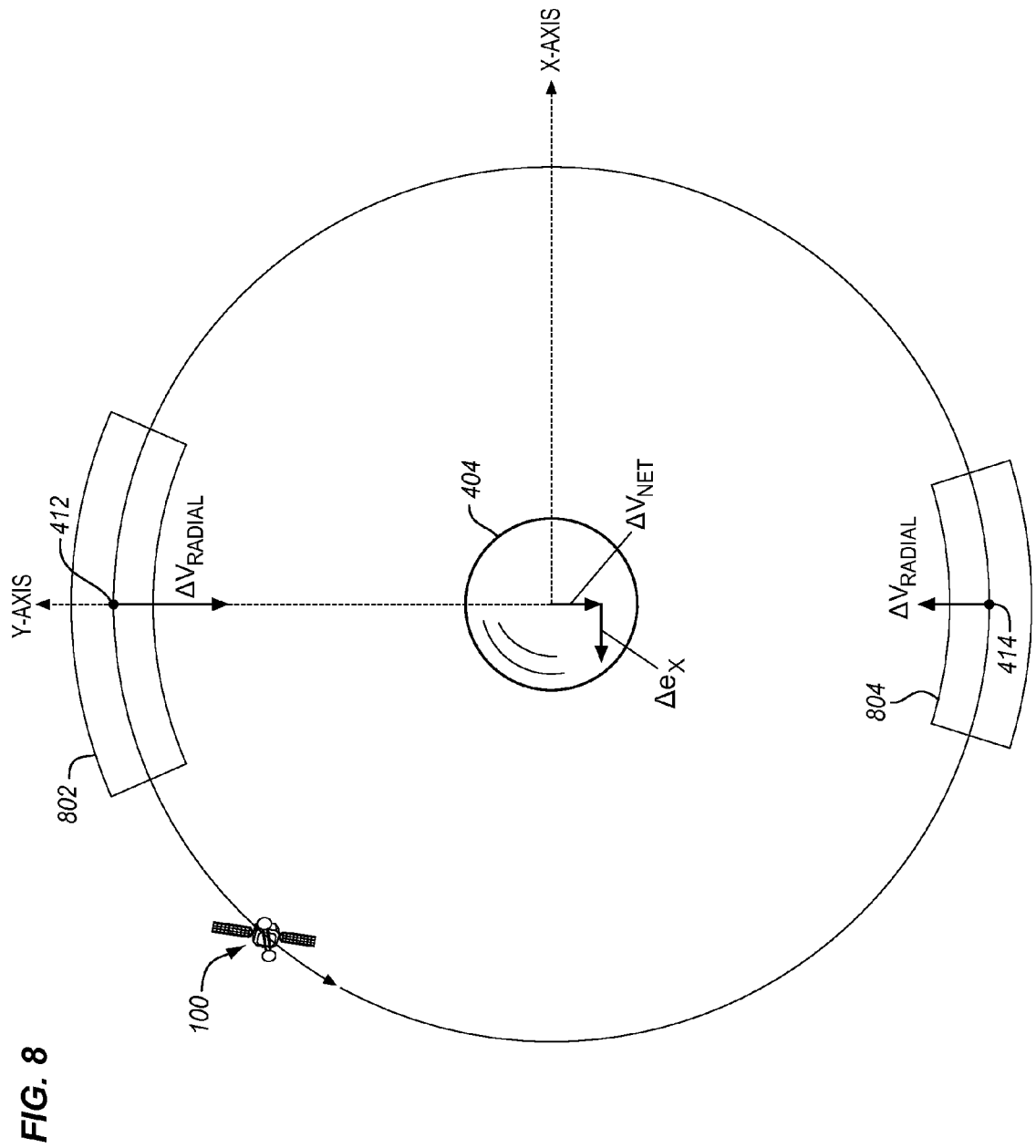
FIG. 8 illustrates a difference in burn durations proximate to an ascending node and a descending node in an exemplary embodiment.

The stationkeeping maneuvers described herein are able to compensate for eccentricity caused by solar radiation pressure and other perturbations. The stationkeeping maneuvers produce a target Δe in a direction opposite the eccentricity caused by solar radiation pressure and other perturbations. To produce the target Δe, the duration of the burn proximate to the ascending node 412 differs from the duration of the burn proximate to the descending node 414. FIG. 8 illustrates a difference in burn durations proximate to the ascending node 412 and the descending node 414 in an exemplary embodiment. In this embodiment, a burn duration 802 of the north electric thruster 210 is shown proximate to the ascending node 412, and a burn duration 804 of the south electric thruster 211 is shown proximate to the descending node 414. The total or combined burn time of thrusters 210-211 is determined at least in part to compensate for the inclination of the orbital plane 408. The difference in burn durations 802 and 804 produces a Δe component along the x-axis. For example, if the total burn time is 6 hours, then burn duration 802 may be apportioned at 4 hours while burn duration 804 may be apportioned at 2 hours. The burn of the north electric thruster 210 creates a $\Delta V_{radial}$ that is greater than the $\Delta V_{radial}$ created by the burn of the south electric thruster 211. The net $\Delta V_{radial}$ produced by the two maneuvers is substantially along the y-axis and results in a Δe component along the x-axis. The radial velocities would cancel if the burns were of the same duration. When there is a difference between the burn durations of the north electric thruster 210 and the south electric thruster 211, the $\Delta V_{radial}$ at the orbital nodes do not cancel and a net $\Delta V_{radial}$ remains. In the example shown in FIG. 8, the magnitude of the $\Delta V_{radial}$ at the ascending node 412 is greater than the magnitude of the $\Delta V_{radial}$ at the descending node 414 because the burn duration is longer at the ascending node 412. The difference in burn durations at the two orbital nodes results in a Δe component along the negative x-axis.

Figure 9:
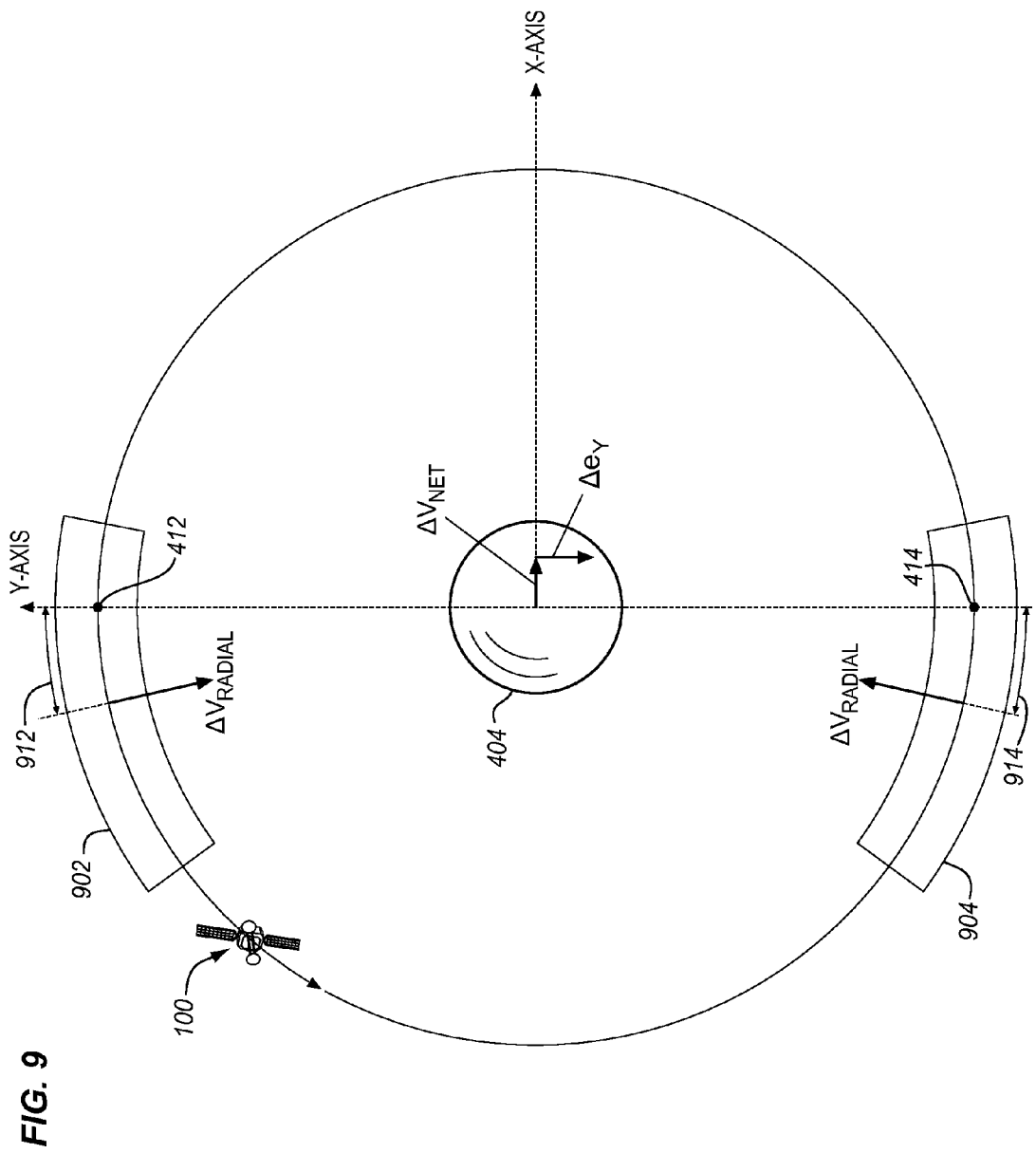
FIG. 9 illustrates an offset of a burn proximate to an ascending node and an offset of a burn proximate to a descending node in an exemplary embodiment.

To further produce a target Δe based on the maneuvers, the burns proximate to the ascending node 412 and the descending node 414 may be shifted in time in relation to their respective orbital nodes. FIG. 9 illustrates an offset of the burn proximate to the ascending node 412 and an offset of the burn proximate to the descending node 414 in an exemplary embodiment. In this embodiment, a burn 902 of the north electric thruster 210 is shown proximate to the ascending node 412, and a burn 904 of the south electric thruster 211 is shown proximate to the descending node 414. The center of burn 902 is shifted from the ascending node 412 by an offset 912. The center of burn 902 is shown as being after the ascending node 412, but it may be before the ascending node 412 in other examples. The center of burn 904 is shifted from the descending node 414 by an offset 914. The center of burn 904 is shown as being before the descending node 414, but it may be after the descending node 414 in other examples. The offsets 912 and 914 may be defined by shifts in time, degrees, etc.

The difference in offsets of burns 902 and 904 produces a $\Delta e$ component substantially along the y-axis. The burn 902 of the north electric thruster 210 creates a $\Delta V_{radial}$ and the burn 904 of the south electric thruster 211 creates a $\Delta V_{radial}$. A net $\Delta V_{radial}$ is produced by the two maneuvers, which results in a $\Delta e$ component along the y-axis. The radial velocities would cancel if the burns were centered at the orbital nodes 412 and 414. When there is a variation between the offsets of the north electric thruster 210 and the south electric thruster 211, the $\Delta V_{radial}$ at the orbital nodes do not cancel, and a net $\Delta V_{radial}$ remains.

Figure 10:
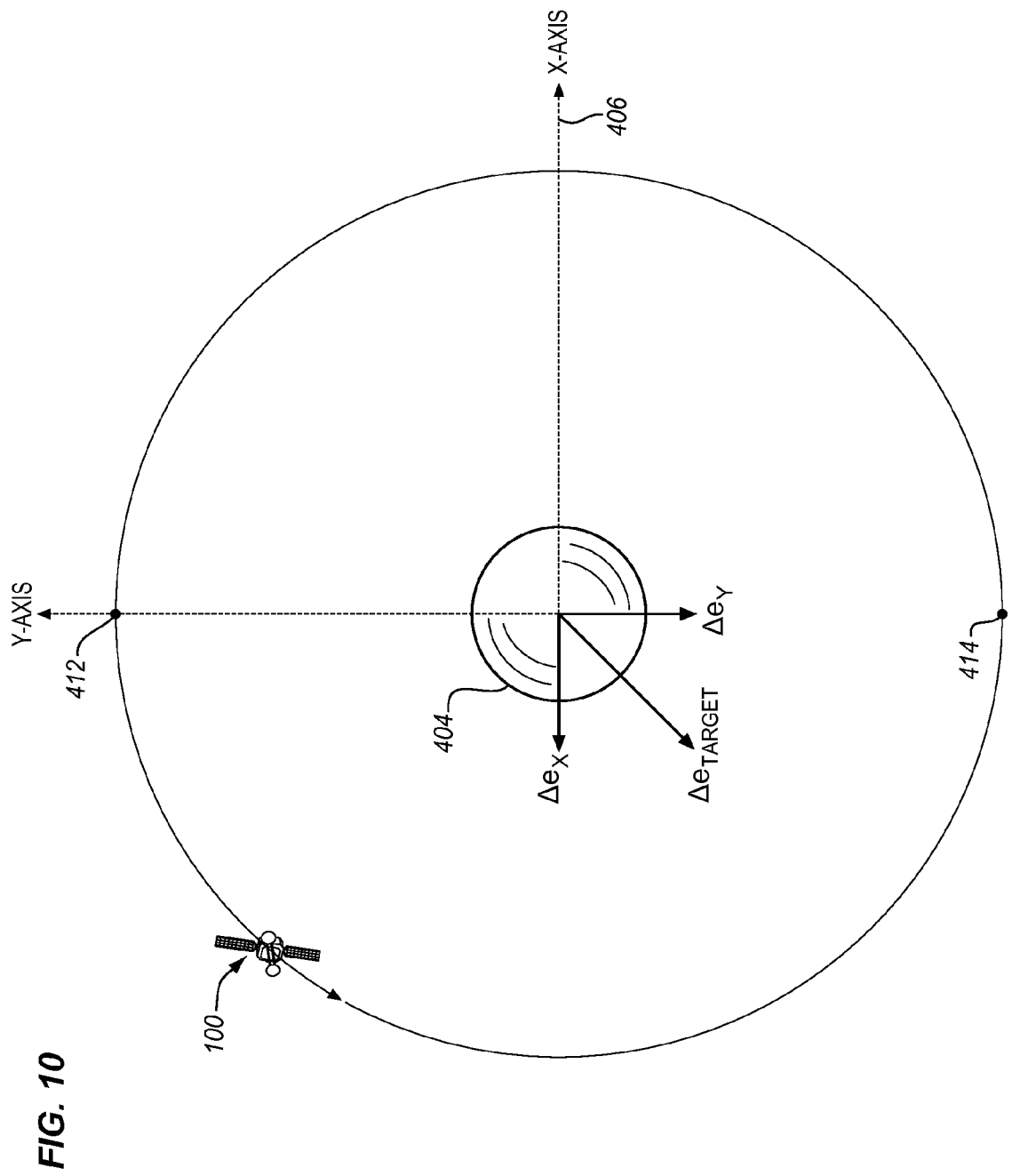
FIG. 10 illustrates a target Δe produced by stationkeeping maneuvers in an exemplary embodiment.

To produce the target $\Delta e$, orbit controller 120 may vary the burn durations between the orbital nodes to produce the $\Delta e$ component along the x-axis (or substantially along the x-axis). Also, orbit controller 120 may vary the offset of the burns proximate to the orbital nodes to produce the $\Delta e$ component along the y-axis (or substantially along the y-axis). The combination of these two variations can produce a net $\Delta V_{radial}$, which in turn produces the target $\Delta e$ ($\Delta e_{target} = \Delta e_x + \Delta e_y$) that can compensate for the eccentricity produced by solar radiation pressure and other perturbations. FIG. 10 illustrates the target $\Delta e$ produced by the stationkeeping maneuvers in an exemplary embodiment. Assume for FIG. 10 that the difference between burn durations produces a $\Delta e_x$ component and the difference in the offsets of the burns produces a $\Delta e_y$ component. The $\Delta e_x$ and the $\Delta e_y$ components add to create the target $\Delta e$. Orbit controller 120 can adjust the maneuvers so that the target $\Delta e$ points in a direction opposite the direction of the eccentricity vector produced by solar radiation pressure and other perturbations as shown in FIG. 7. Therefore, the stationkeeping maneuvers can compensate for the eccentricity produced by the Sun 702.

If the maneuvers performed by the electric thrusters 210-211 do not provide enough of a $\Delta V_{radial}$ to produce the target $\Delta e$, orbit controller 120 can also fire the west chemical thruster 220 and/or the east chemical thruster 221 to assist in producing the target $\Delta e$. The burns of chemical thrusters 220-221 may be performed at or near an orbital node, or may be performed at other locations along the orbit of satellite 100 based on the desired direction of the target $\Delta e$. To add to the $\Delta e$ component produced by the burns of electric thrusters 210-211, orbit controller 120 may control a burn of east chemical thruster 221 at a location along the orbit of satellite 100 which produces a $\Delta V_{tan}$ of satellite 100. The $\Delta V_{tan}$ produces a $\Delta e$ component due to the burn of east chemical thruster 221. Orbit controller 120 may also control a burn of west chemical thruster 220 at a location along the orbit of satellite 100 which produces another $\Delta V_{tan}$ of satellite 100. The $\Delta V_{tan}$ produces a $\Delta e$ component due to the burn of west chemical thruster 220. Orbit controller 120 selects the locations of the burns of chemical thrusters 220-221 so that the $\Delta e$ components from these burns add to the $\Delta e$ component from the burns of electric thrusters 210-211 to produce the target $\Delta e$.

Figure 11:
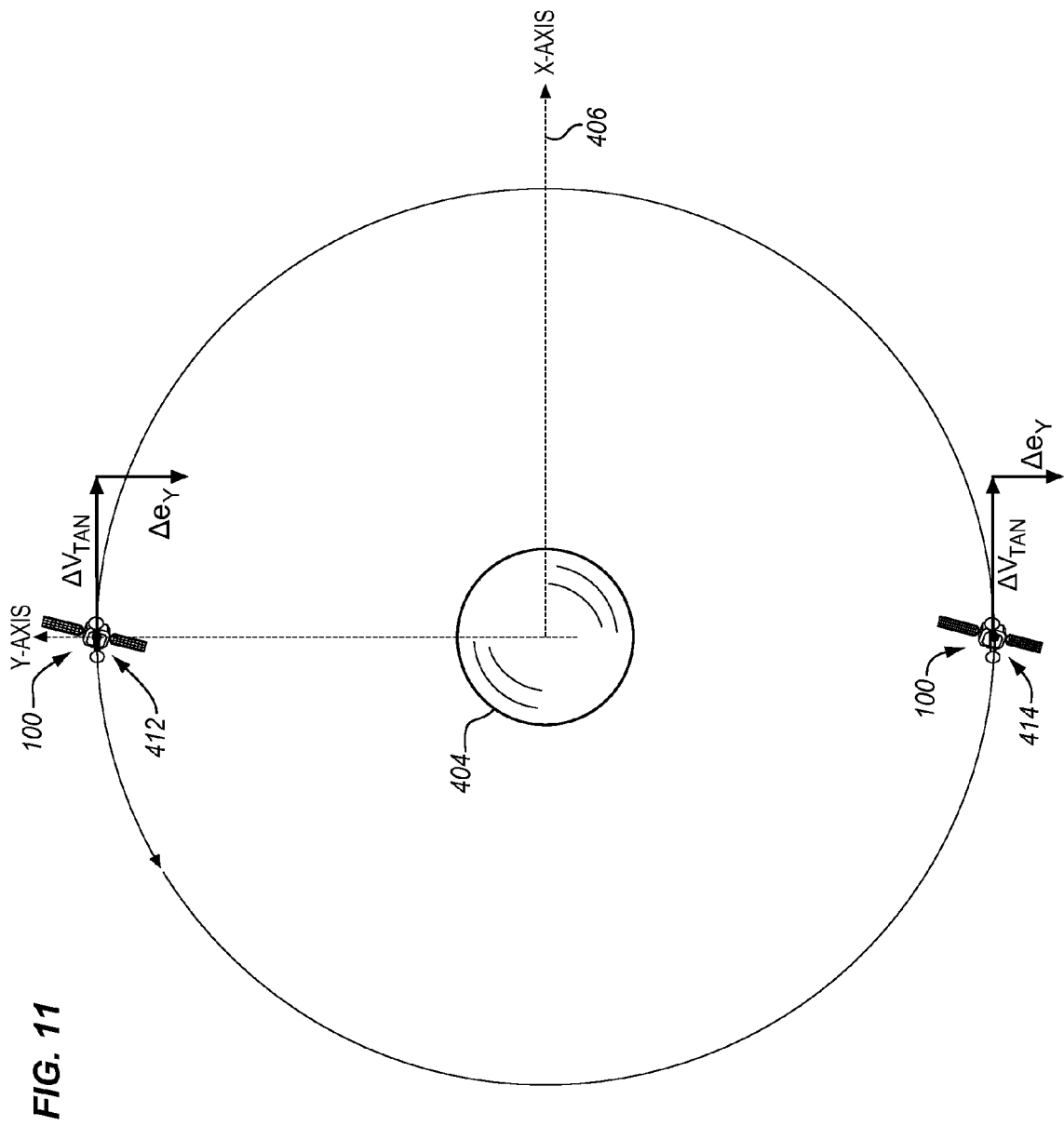
FIG. 11 illustrates a burn of a chemical thruster proximate to an ascending node and/or a descending node in an exemplary embodiment.

FIG. 11 illustrates a burn of a chemical thruster proximate to the ascending node 412 and/or the descending node 414 in an exemplary embodiment. A burn of the east chemical thruster 221 will produce a $\Delta V$ in the tangential direction. This $\Delta V$ is against the orbital motion of satellite 100 and is referred to as a retrograde burn. The $\Delta V_{tan}$ proximate to ascending node 412 is along the x-axis, which creates a $\Delta e$ component substantially along the y-axis. This $\Delta e_y$ component is added to the $\Delta e$ component due to the burns of electric thrusters 210-211 to produce the target $\Delta e$. A burn of the west chemical thruster 220 will produce a $\Delta V$ in the tangential direction. This $\Delta V$ is with the orbital motion of satellite 100 and is referred to as a prograde burn. The $\Delta V_{tan}$ proximate to descending node 414 is along the x-axis, which creates a $\Delta e$ component substantially along the y-axis. This $\Delta e_y$ component is added to the $\Delta e$ component due to the burns of the electric thrusters 210-211 and the $\Delta e_y$ component due to the burn of the east chemical thruster 221 to produce the target $\Delta e$. The maneuvers shown in FIG. 11 are just one example to show how burns of one or more of the chemical thrusters 220-221 can add to the $\Delta e$ components produced by the burns of the electric thrusters 210-211.

Figure 12:
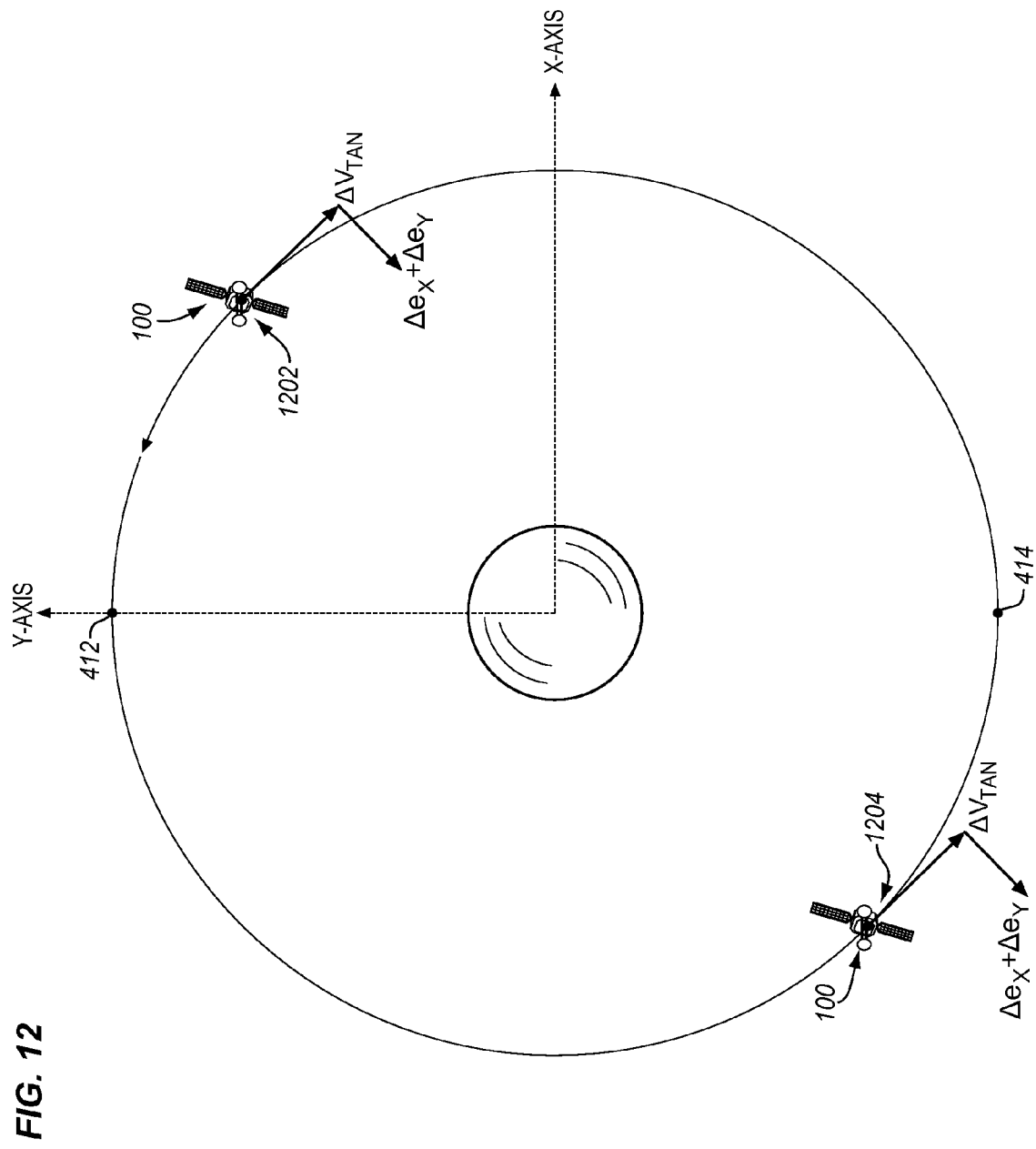
FIG. 12 illustrates a burn of a chemical thruster at locations along the orbit of the satellite in an exemplary embodiment.

FIG. 12 illustrates a burn of a chemical thruster at locations along the orbit of satellite 100 in an exemplary embodiment. The burn of west chemical thruster 220 and/or east chemical thruster 221 may be at virtually any location along the orbit. A burn of the east chemical thruster 221 will produce a $\Delta V_{tan}$ at a location 1202, which creates a $\Delta e_x$ component and a $\Delta e_y$ component. The $\Delta e_x$ and $\Delta e_y$ components may be added to the $\Delta e$ component due to the burns of the electric thrusters 210-211 to produce the target $\Delta e$. Likewise, a burn of the west chemical thruster 220 will produce a $\Delta V_{tan}$ at a location 1204, which creates a $\Delta e_x$ component and a $\Delta e_y$ component. The $\Delta e_x$ and $\Delta e_y$ components may be added to the $\Delta e$ component due to the burns of the electric thrusters 210-211, and the $\Delta e_x$ and $\Delta e_y$ components due to the burn of the east chemical thruster 221 to produce the target $\Delta e$. Locations 1202 and 1204 are typically 180° apart, but the locations may vary from 180° apart depending on the desired $\Delta e$ components. The maneuvers shown in FIG. 12 are just one example to show how burns of one or more of the chemical thrusters 220-221 can add to the $\Delta e$ components produced by the burns of the electric thrusters 210-211.

Figure 13:
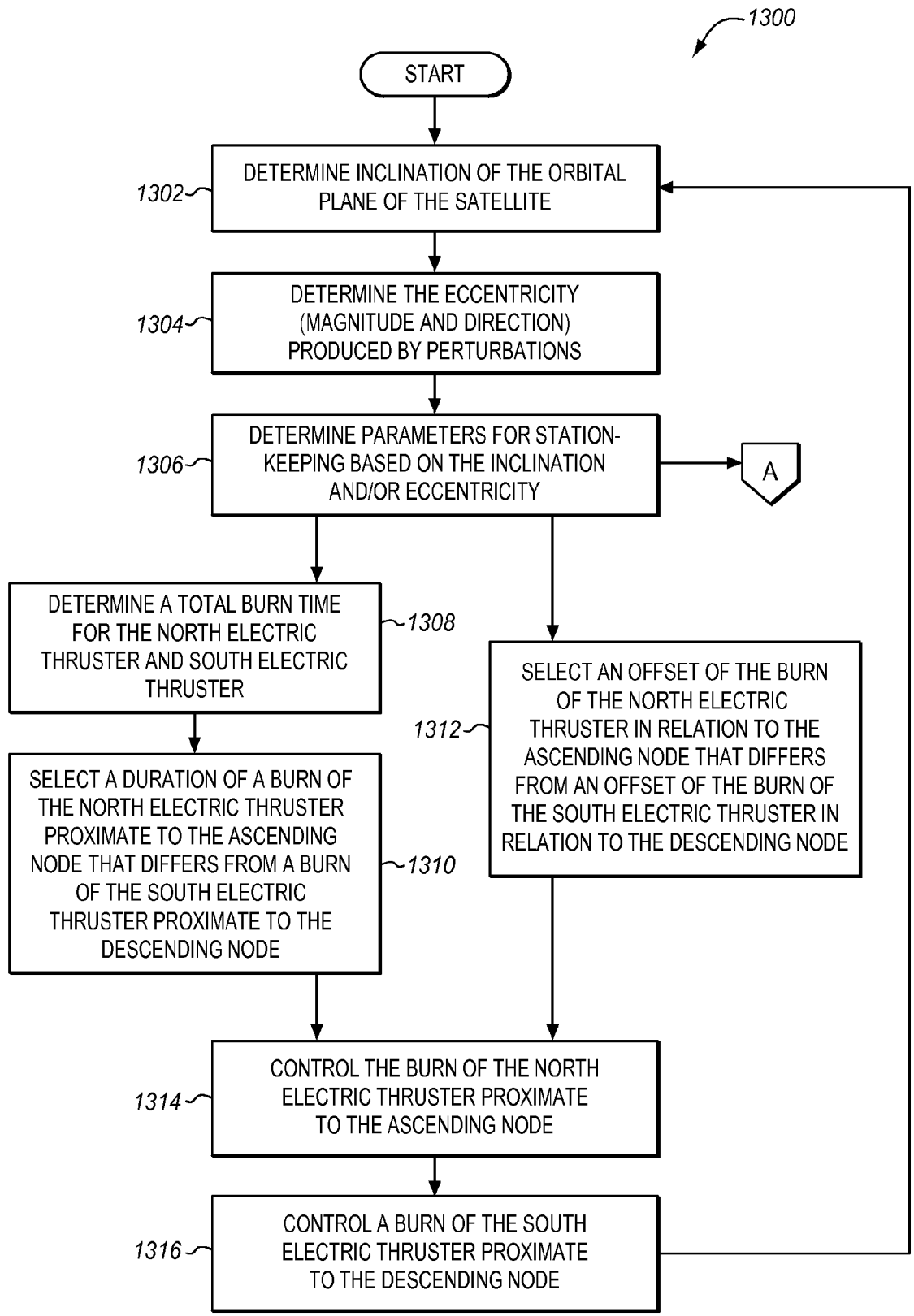
FIGS. 13-14 are flow charts illustrating a method for controlling stationkeeping maneuvers for a satellite in an exemplary embodiment.
Figure 14:
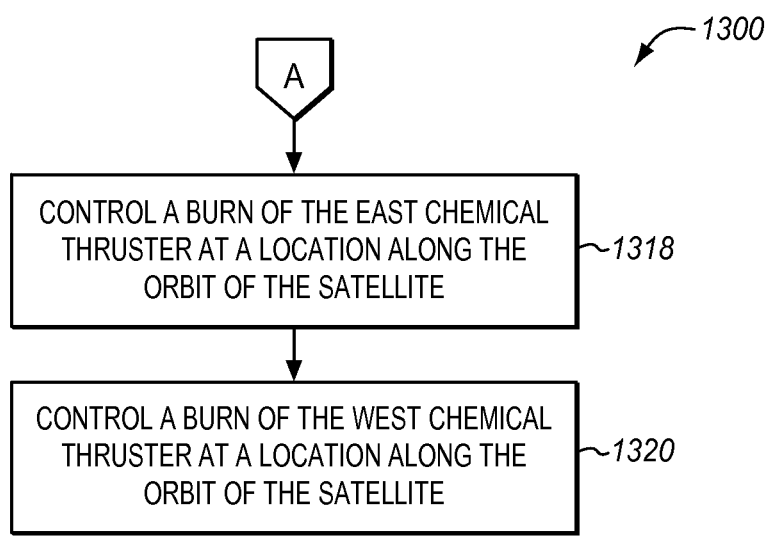

Orbit controller 120 may implement any combination of the maneuvers described above to produce a target $\Delta e$. An exemplary process for stationkeeping implemented by orbit controller 120 is shown in FIGS. 13-14. FIGS. 13-14 are flow charts illustrating a method 1300 for controlling stationkeeping maneuvers for satellite 100 in an exemplary embodiment. The steps of method 1300 will be described with respect to satellite 100 of FIGS. 1-3, although one skilled in the art will understand that the methods described herein may be performed for other satellites or systems not shown. The steps of the methods described herein are not all inclusive and may include other steps not shown. The steps for the flow charts shown herein may also be performed in an alternative order.

When initiating the stationkeeping maneuvers, orbit controller 120 may determine or identify the inclination of the orbital plane 408 of satellite 100 (step 1302). Orbit controller 120 may also determine, identify, or estimate an eccentricity produced by perturbations, such as solar radiation pressure (step 1304). As described above, the eccentricity from solar radiation pressure changes direction based on the location of the Sun. Thus, orbit controller 120 can estimate the direction and magnitude of the eccentricity produced by solar radiation pressure based on the time of year.

Orbit controller 120 then determines the parameters for the stationkeeping maneuvers to compensate for inclination of the orbital plane 408 and/or the eccentricity produced by perturbations, such as solar radiation pressure. In determining the parameters, orbit controller 120 determines a total burn time for the north electric thruster 210 and the south electric thruster 210 in combination (step 1308). The total burn time for the north electric thruster 210 and the south electric thruster 211 is calculated to compensate for the inclination of the orbital plane 408. Orbit controller 120 then partitions the total burn time into different burn durations proximate to the ascending node 412 and the descending node 414. When a burn is "proximate to" an orbital node, the burn is near or close to an orbital node. Orbit controller 120 selects a duration of a burn of the north electric thruster 210 proximate to the ascending node 412 that differs from a duration of a burn of the south electric thruster 211 proximate to the descending node 414 (step 1310). The difference in the burn durations proximate to the ascending and descending nodes creates a Δe component substantially along the x-axis (see FIG. 8).

Orbit controller 120 also determines when the burns are performed in relation to the orbital nodes. Orbit controller 120 selects an offset of the burn of the north electric thruster 210 in relation to the ascending node 412 that differs from an offset of the burn of the south electric thruster 211 in relation to the descending node 414 (step 1312). An offset indicates a shift of the center of a burn from an orbital node. In traditional stationkeeping maneuvers, burns were centered about the ascending node and the descending node. In this embodiment, the center of the burns of the north electric thruster 210 and the south electric thruster 211 may be shifted off-center of the orbital nodes in time, degrees, etc. The minimum offset for one of the burns is zero, and the maximum offset is limited by the duration of the burn and the amount of inclination correction desired. The difference in the burn offsets proximate to the ascending and descending nodes creates a Δe component substantially along the y-axis (see FIG. 9).

Orbit controller 120 then controls the burn of the north electric thruster 210 proximate to the ascending node 412 (step 1314), and controls the burn of the south electric thruster 211 proximate to the descending node 414 (step 1316). The burns of the electric thrusters 210-211 may be performed daily (or nearly daily over the period of a year or longer).

If the burns of the electric thrusters do not provide enough of a Δe component, then orbit controller 120 may control a burn of the west chemical thruster 220 and/or the east chemical thruster 221 as shown in FIG. 14. Orbit controller 120 may control a burn of east chemical thruster 221 at a location along the orbit of satellite 100 (step 1318), which produces a $\Delta V_{tan}$ of satellite 100. The $\Delta V_{tan}$ produces a Δe component due to the burn of east chemical thruster 221. Orbit controller 120 may additionally or alternatively control a burn of west chemical thruster 220 at a location along the orbit of satellite 100 (step 1320), which produces a $\Delta V_{tan}$ of satellite 100. The $\Delta V_{tan}$ produces a Δe component due to the burn of west chemical thruster 220. Orbit controller 120 selects the location of the burn of east chemical thruster 221 and/or the location of the burn of west chemical thruster 220 so that their Δe components add to the Δe component due to the burn of the electric thrusters 210-211. The addition of these Δe components compensate for the eccentricity due to perturbations.

A combination of burns as described above is able to produce a target Δe to compensate for perturbations. For example, to counteract the eccentricity caused by the Sun, the stationkeeping maneuvers described above can produce a target Δe that points about 90° behind the Sun. The target Δe points in an opposite direction than the eccentricity vector cause by the Sun. As the position of the Sun changes during the year, orbit controller 120 can adjust the stationkeeping maneuvers so the target Δe continues to point about 90° behind the Sun.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
  a satellite configured to orbit around the Earth, the satellite comprising:
    a satellite bus having a nadir side that faces the Earth and a zenith side opposite the nadir side;
    a north electric thruster installed toward a north region of the zenith side and oriented downward to produce thrust through a center of mass of the satellite;
    a south electric thruster installed toward a south region of the zenith side and oriented upward to produce thrust through the center of mass of the satellite;
    an east chemical thruster installed on an east side of the satellite bus to produce thrust through the center of mass of the satellite; and
    a west chemical thruster installed on a west side of the satellite bus to produce thrust through the center of mass of the satellite; and
    an orbit controller that controls stationkeeping maneuvers for the satellite;
    the orbit controller selects a duration of a burn of the north electric thruster proximate to an ascending node that differs from a duration of a burn of the south electric thruster proximate to a descending node;
    the orbit controller selects an offset of the burn of the north electric thruster in relation to the ascending node that differs from an offset of the burn of the south electric thruster in relation to the descending node;
    the orbit controller controls a burn of one of the west chemical thruster or the east chemical thruster proximate to the ascending node.

2. The apparatus of claim 1 wherein:
the orbit controller controls a burn of the other one of the west chemical thruster or the east chemical thruster proximate to the descending node.

3. The apparatus of claim 1 wherein:
the orbit controller determines an inclination of an orbital plane of the satellite, and determines a total burn time for the burn of the north electric thruster and the burn of the south electric thruster based on the inclination.

4. The apparatus of claim 1 wherein:
the orbit controller determines a position of the Sun in a geocentric coordinate system based on time of year, and selects the duration and offset of the burn of the north electric thruster and the duration and offset of the burn of the south electric thruster to produce a target eccentricity change that points behind the position of the Sun by 90°±5°.

5. The apparatus of claim 1 wherein:
the north electric thruster is oriented at a first angle to a north-south axis of the satellite, wherein the first angle is 35°±25°; and
the south electric thruster is oriented at a second angle to the north-south axis of the satellite, wherein the second angle is 35°±25°.

6. The apparatus of claim 1 wherein:
the north electric thruster and the south electric thruster use xenon as a propellant.

7. A method for controlling stationkeeping maneuvers for a satellite, wherein the satellite comprises a satellite bus having a nadir side that faces the Earth and a zenith side opposite the nadir side, a north electric thruster installed toward a north region of the zenith side and oriented downward to produce thrust through a center of mass of the satellite, a south electric thruster installed toward a south region of the zenith side and oriented upward to produce thrust through the center of mass of the satellite, an east chemical thruster installed on an east side of the satellite bus to produce thrust through the center of mass of the satellite, and a west chemical thruster installed on a west side of the satellite bus to produce thrust through the center of mass of the satellite, the method comprising:
selecting a duration of a burn of the north electric thruster proximate to an ascending node that differs from a duration of a burn of the south electric thruster proximate to a descending node;
selecting an offset of the burn of the north electric thruster in relation to the ascending node that differs from an offset of the burn of the south electric thruster in relation to the descending node; and
controlling a burn of one of the west chemical thruster or the east chemical thruster proximate to the ascending node.

8. The method of claim 7 further comprising:
controlling a burn of the other one of the west chemical thruster or the east chemical thruster proximate to the descending node.

9. The method of claim 7 further comprising:
determining an inclination of an orbital plane of the satellite; and
determining a total burn time for the burn of the north electric thruster and the burn of the south electric thruster based on the inclination.

10. The method of claim 7 further comprising:
determining a position of the Sun in a geocentric coordinate system based on time of year; and
selecting the duration and offset of the burn of the north electric thruster and the duration and offset of the burn of the south electric thruster to produce a target eccentricity change that points behind the position of the Sun by 90°±5°.

11. An apparatus comprising:
an orbit controller configured to control stationkeeping maneuvers of a satellite, wherein the satellite comprises:
a satellite bus having a nadir side that faces the Earth and a zenith side opposite the nadir side;
a north electric thruster installed toward a north region of the zenith side and oriented downward to produce thrust through a center of mass of the satellite;
a south electric thruster installed toward a south region of the zenith side and oriented upward to produce thrust through the center of mass of the satellite;
an east chemical thruster installed on an east side of the satellite bus to produce thrust through the center of mass of the satellite; and
a west chemical thruster installed on a west side of the satellite bus to produce thrust through the center of mass of the satellite;
the orbit controller selects a duration of a burn of the north electric thruster proximate to an ascending node that differs from a duration of a burn of the south electric thruster proximate to a descending node;
the orbit controller selects an offset of the burn of the north electric thruster in relation to the ascending node that differs from an offset of the burn of the south electric thruster in relation to the descending node;
the difference in the burn durations for the electric thrusters and the difference in the offsets of the burns of the electric thrusters produce a net radial velocity change of the satellite, wherein the net radial velocity change produces a delta-eccentricity component for the orbit of the satellite due to the burns of the electric thrusters;
the orbit controller controls a burn of one of the east chemical thruster or the west chemical thruster at a first location along the orbit of the satellite which produces a first tangential velocity change of the satellite;
wherein the first tangential velocity change produces a delta-eccentricity component due to the burn of the one chemical thruster;
wherein the first location of the burn of the one chemical thruster is selected so that the delta-eccentricity component due to the burn of the one chemical thruster adds to the delta-eccentricity component due to the burns of the electric thrusters.

12. The apparatus of claim 11 wherein:
the orbit controller controls a burn of the other one of the east chemical thruster or the west chemical thruster at a second location along the orbit of the satellite which produces a second tangential velocity change of the satellite;
wherein the second tangential velocity change produces a delta-eccentricity component due to the burn of the other chemical thruster; and
wherein the second location of the burn of the other chemical thruster is selected so that the delta-eccentricity component due to the burn of the other chemical thruster adds to the delta-eccentricity component due to the burns of the electric thrusters and the delta-eccentricity component due to the burn of the one chemical thruster.

13. The apparatus of claim 11 wherein:
the orbit controller determines an inclination of an orbital plane of the satellite, and determines a total burn time for the burn of the north electric thruster and the burn of the south electric thruster based on the inclination.

14. The apparatus of claim 11 wherein:
the orbit controller determines a position of the Sun in a geocentric coordinate system based on time of year, and selects the duration and offset of the burn of the north electric thruster and the duration and offset of the burn of the south electric thruster to produce a target eccentricity change that points behind the position of the Sun by 90°±5°.

15. The apparatus of claim 11 wherein:
the north electric thruster is oriented at a first angle to a north-south axis of the satellite, wherein the first angle is 35°±25°; and
the south electric thruster is oriented at a second angle to the north-south axis of the satellite, wherein the second angle is 35°±25°.

16. The apparatus of claim 11 wherein:
the north electric thruster and the south electric thruster use xenon as a propellant.

17. A method for controlling stationkeeping maneuvers for a satellite, wherein the satellite comprises a satellite bus having a nadir side that faces the Earth and a zenith side opposite the nadir side, a north electric thruster installed toward a north region of the zenith side and oriented downward to produce thrust through a center of mass of the satellite, a south electric thruster installed toward a south region of the zenith side and oriented upward to produce thrust through the center of mass of the satellite, an east chemical thruster installed on an east side of the satellite bus to produce thrust through the center of mass of the satellite, and a west chemical thruster installed on a west side of the satellite bus to produce thrust through the center of mass of the satellite, the method comprising:
selecting a duration of a burn of the north electric thruster proximate to an ascending node that differs from a duration of a burn of the south electric thruster proximate to a descending node;
selecting an offset of the burn of the north electric thruster in relation to the ascending node that differs from an offset of the burn of the south electric thruster in relation to the descending node, wherein the difference in the burn durations for the electric thrusters and the difference in the offsets of the burns of the electric thrusters produce a net radial velocity change of the satellite, wherein the net radial velocity change produces a delta-eccentricity component for the orbit of the satellite due to the burns of the electric thrusters; and
controlling a burn of one of the east chemical thruster or the west chemical thruster at a first location along the orbit of the satellite which produces a first tangential velocity change of the satellite;
wherein the first tangential velocity change produces a delta-eccentricity component due to the burn of the one chemical thruster;
wherein the first location of the burn of the one chemical thruster is selected so that the delta-eccentricity component due to the burn of the one chemical thruster adds to the delta-eccentricity component due to the burns of the electric thrusters.

18. The method of claim 17 further comprising:
controlling a burn of the other one of the east chemical thruster or the west chemical thruster at a second location along the orbit of the satellite which produces a second tangential velocity change of the satellite;
wherein the second tangential velocity change produces a delta-eccentricity component due to the burn of the other chemical thruster; and
wherein the second location of the burn of the other chemical thruster is selected so that the delta-eccentricity component due to the burn of the other chemical thruster adds to the delta-eccentricity component due to the burns of the electric thrusters and the delta-eccentricity component due to the burn of the one chemical thruster.

19. The method of claim 18 further comprising:
determining an inclination of an orbital plane of the satellite; and
determining a total burn time for the burn of the north electric thruster and the burn of the south electric thruster based on the inclination.

20. The method of claim 18 further comprising:
determining a position of the Sun in a geocentric coordinate system based on time of year; and
selecting the duration and offset of the burn of the north electric thruster and the duration and offset of the burn of the south electric thruster to produce a target eccentricity change that points behind the position of the Sun by 90°±5°.

* * * * *